United States Patent
Song et al.

(10) Patent No.: US 11,716,273 B2
(45) Date of Patent: Aug. 1, 2023

(54) ON-PATH TELEMETRY FOR MULTICAST TRAFFIC

(71) Applicant: Huawei Technologies Co., Ltd., Shenzhen (CN)

(72) Inventors: Haoyu Song, San Jose, CA (US); Michael McBride, Laguna Niguel, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/840,125

(22) Filed: Apr. 3, 2020

(65) Prior Publication Data

US 2020/0412633 A1 Dec. 31, 2020

Related U.S. Application Data (63) Continuation of application No. PCT/US2019/039453, filed on Jun. 27, 2019.

(51) Int. Cl.
*H04L 45/16* (2022.01)
*H04L 43/10* (2022.01)
*H04L 41/12* (2022.01)
*H04L 69/22* (2022.01)

(52) U.S. Cl.
CPC .......... *H04L 43/10* (2013.01); *H04L 41/12* (2013.01); *H04L 45/16* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 5,355,371 A | 10/1994 | Auerbach et al. | |
| 10,284,460 B1* | 5/2019 | Bshara | H04L 43/0817 |
| 10,862,807 B2* | 12/2020 | Vytla | H04L 47/2483 |
| 2005/0111453 A1* | 5/2005 | Mizutani | H04L 12/56 |
| | | | 370/390 |
| 2009/0080340 A1* | 3/2009 | Duffield | H04L 43/0852 |
| | | | 370/252 |

(Continued)

FOREIGN PATENT DOCUMENTS

| | | |
|---|---|---|
| CN | 104796340 A | 7/2015 |
| CN | 108111327 A | 6/2018 |

(Continued)

OTHER PUBLICATIONS

Song, H., et al., "Postcard-based On-Path Flow Data Telemetry," XP015133337, draft-song-ippm-postcard-based-telemetry-04, Jun. 12, 2019,17 pages.

(Continued)

*Primary Examiner* — James A Edwards
(74) *Attorney, Agent, or Firm* — Conley Rose, P.C.

(57) ABSTRACT

A per-hop postcard technique is disclosed. The per-hop postcard technique is implemented to improve Postcard-based Telemetry (PBT). A per-section postcard technique is also disclosed. The per-section postcard technique is implemented to improve In-situ OAM (IOAM). By utilizing these techniques, suitable on-path telemetry may be obtained for multicast traffic. In addition, these techniques may be used to reconstruct and visualize a multicast tree, to conduct performance monitoring, and to perform trouble shooting.

22 Claims, 8 Drawing Sheets

(56) References Cited

U.S. PATENT DOCUMENTS

| | | | |
|---|---|---|---|
| 2012/0057518 A1* | 3/2012 | Herrala | H04W 84/20 |
| | | | 370/315 |
| 2012/0230199 A1* | 9/2012 | Chiabaut | H04L 45/12 |
| | | | 370/238 |
| 2013/0107725 A1* | 5/2013 | Jeng | H04L 45/50 |
| | | | 370/248 |
| 2015/0103691 A1 | 4/2015 | Bhattacharya et al. | |
| 2016/0295453 A1* | 10/2016 | Minamiyama | H04W 52/0219 |
| 2017/0353367 A1 | 12/2017 | Slaight et al. | |
| 2019/0268267 A1* | 8/2019 | Pignataro | H04L 45/72 |
| 2019/0288938 A1* | 9/2019 | Song | H04L 43/106 |
| 2019/0296988 A1* | 9/2019 | Bhandari | H04L 47/125 |
| 2019/0319876 A1* | 10/2019 | Gumaste | H04L 45/28 |
| 2019/0372877 A1* | 12/2019 | Nainar | H04L 12/1895 |
| 2020/0084522 A1* | 3/2020 | Mirsky | H04L 47/34 |

FOREIGN PATENT DOCUMENTS

| | | |
|---|---|---|
| CN | 109314670 A | 2/2019 |
| WO | 0156204 A1 | 8/2001 |

OTHER PUBLICATIONS

Handigol, N., et al., "I Know What Your Packet Did Last Hop: Using Packet Histories to Troubleshoot Networks," XP055383673, Apr. 4, 2014, pp. 71-85.

Song, H., et al., "Toward a Network Telemetry Framework," XP015127551, draft-song-ntf-02, Jul. 2, 2018, 24 pages.

Kaljic, E., et al., "A Survey on Data Plane Flexibility and Programmability in Software-Defined Networking," XPOS1132368, Mar. 12, 2019, 38 pages.

Foreign Communication From A Counterpart Application, PCT Application No. PCT/US2019/039453, International Search Report dated Feb. 5, 2020, 6 pages.

Foreign Communication From A Counterpart Application, PCT Application No. PCT/US2019/039453, Written Opinion dated Feb. 5, 2020, 13 pages.

Song, H., Ed., et al., "Postcard-based On-Path Flow Data Telemetry," draft-song-ippm-postcard-based-telemetry-03, Apr. 22, 2019, 17 pages.

Brockners, F., et al., "Data Fields for In-situ OAM," draft-brockners-inband-oam-data-07, Jul. 2, 2017, 29 pages.

* cited by examiner

FIG. 1

(Prior Art)

FIG. 2

(Prior Art)

ON-PATH TELEMETRY FOR MULTICAST TRAFFIC

CROSS-REFERENCE TO RELATED APPLICATIONS

The present application is a continuation of International Application No. PCT/US2019/039453 filed Jun. 27, 2019, by Futurewei Technologies, Inc., and titled "On-Path Telemetry For Multicast Traffic," the teachings and disclosures of which are hereby incorporated in their entireties by reference thereto.

TECHNICAL FIELD

The present disclosure is generally related to multicast traffic and, in particular, to on-path telemetry for multicast traffic.

BACKGROUND

Multicast traffic is an important traffic type in today's Internet. Multicast provides services that are often real time (e.g., an online meeting) or have strict quality of service (QoS) requirements (e.g., Internet Protocol television (IPTV)). As such, multicast packet drop or delay can severely affect the application performance and the user experience. Therefore, the performance of the multicast traffic is often closely monitored.

SUMMARY

A first aspect relates to a method of collecting on-path telemetry data by a node in a multicast network. The method includes receiving a multicast packet containing an instruction header; collecting on-path telemetry data at the node as instructed by the instruction header; determining whether the node is an end node of a section; transmitting a postcard containing the on-path telemetry data collected by all nodes in the section to a controller when the node is the end node of the section; and transmitting the instruction header and the on-path telemetry data collected by the node to a downstream node when the node is not the end node of the section.

The method provides techniques that support efficient multicast traffic on-path telemetry. In particular, the method provides a per-section postcard technique to improve the In-situ OAM (IOAM) process. By utilizing the technique, suitable on-path telemetry may be obtained for multicast traffic. In addition, the techniques may be used to reconstruct and visualize a multicast tree, to conduct performance monitoring, and to perform trouble shooting.

In a first implementation form of the method according to the first aspect as such, the section extends between a root node and the end node.

In a second implementation form of the method according to the first aspect as such or any preceding implementation form of the first aspect, the section extends between a branch node and the end node.

In a third implementation form of the method according to the first aspect as such or any preceding implementation form of the first aspect, the instruction header is appended to a multicast packet in accordance with an instruction received from a controller.

In a fourth implementation form of the method according to the first aspect as such or any preceding implementation form of the first aspect, the instruction header is appended to a multicast packet when received.

In a fifth implementation form of the method according to the first aspect as such or any preceding implementation form of the first aspect, the instruction header is appended to a multicast packet when transmitted.

In a sixth implementation form of the method according to the first aspect as such or any preceding implementation form of the first aspect, the instruction header is received from an upstream node.

A second aspect relates to a method of collecting on-path telemetry data by a node in a multicast network. The method includes receiving a multicast packet containing an instruction header; collecting on-path telemetry data at the node as instructed by the instruction header; transmitting a postcard to a collector as instructed by the instruction header, the postcard containing the on-path telemetry data that was collected at the node and a branch identifier, the branch identifier comprising a node identifier (ID) and a branch index; and transmitting the instruction header to a downstream node.

The method provides techniques that support efficient multicast traffic on-path telemetry. In particular, the method provides a per-hop postcard technique to improve the Postcard-based Telemetry (PBT) process. By utilizing the technique, suitable on-path telemetry may be obtained for multicast traffic. In addition, the techniques may be used to reconstruct and visualize a multicast tree, to conduct performance monitoring, and to perform trouble shooting.

In a first implementation form of the method according to the second aspect as such, the branch index identifies a branch from which the instruction header was received.

In a second implementation form of the method according to the second aspect as such or any preceding implementation form of the second aspect, the branch index is an arbitrary number when the node is a root node.

In a third implementation form of the method according to the second aspect as such or any preceding implementation form of the second aspect, the instruction header is appended to a multicast packet in accordance with an instruction received from a controller.

In a fourth implementation form of the method according to the second aspect as such or any preceding implementation form of the second aspect, the instruction header is appended to a multicast packet when received.

In a fifth implementation form of the method according to the second aspect as such or any preceding implementation form of the second aspect, the instruction header is appended to a multicast packet when transmitted.

In a sixth implementation form of the method according to the second aspect as such or any preceding implementation form of the second aspect, the instruction header is received from an upstream node.

In a seventh implementation form of the method according to the second aspect as such or any preceding implementation form of the second aspect, the node ID identifies the node when the node is a root node.

In an eighth implementation form of the method according to the second aspect as such or any preceding implementation form of the second aspect, the node ID identifies an upstream node from which the instruction header was received when the node is a branch node or a leaf node.

In a ninth implementation form of the method according to the second aspect as such or any preceding implementation form of the second aspect, the branch identifier is represented by a tuple with the format [node ID, index].

In a tenth implementation form of the method according to the second aspect as such or any preceding implementation form of the second aspect, the branch index is utilized to construct a network topology.

A third aspect relates to a node configured to collect on-path telemetry data in a multicast network. The node includes a receiver configured to receive a multicast packet containing an instruction header; a processor coupled to the receiver, the processor configured to: collect the on-path telemetry data at the node as instructed by the instruction header; and determine whether the node is an end node of a section; a transmitter coupled to the processor, the transmitter configured to: transmit a postcard to a collector when the node is the end node of the section; and transmit the instruction header and the on-path telemetry data collected by the node to a downstream node when the node is not the end node of the section.

The node provides techniques that support efficient multicast traffic on-path telemetry. In particular, the node provides a per-section postcard technique to improve the IOAM process. By utilizing the technique, suitable on-path telemetry may be obtained for multicast traffic. In addition, the techniques may be used to reconstruct and visualize a multicast tree, to conduct performance monitoring, and to perform trouble shooting.

In a first implementation form of the apparatus according to the third aspect as such, the apparatus further includes a display configured to display an image.

In a first implementation form of the node according to the first aspect as such, the section extends between a root node and the end node.

In a second implementation form of the node according to the third aspect as such or any preceding implementation form of the third aspect, the section extends between a branch node and the end node.

In a third implementation form of the node according to the third aspect as such or any preceding implementation form of the third aspect, the instruction header is appended to a multicast packet in accordance with an instruction received from a controller.

In a fourth implementation form of the node according to the third aspect as such or any preceding implementation form of the third aspect, the instruction header is appended to a multicast packet when received.

In a fifth implementation form of the node according to the third aspect as such or any preceding implementation form of the third aspect, the instruction header is appended to a multicast packet when transmitted.

In a sixth implementation form of the node according to the third aspect as such or any preceding implementation form of the third aspect, the instruction header is received from an upstream node.

In a seventh implementation form of the node according to the third aspect as such or any preceding implementation form of the third aspect, the node comprises a receiver coupled to the processor, the receiver configured to receive an instruction from a controller, the instruction instructing the node to append the instruction header to a multicast packet.

A fourth aspect relates to a node configured to collect on-path telemetry data in a multicast network. The node includes a processor is configured to collect the on-path telemetry data in accordance with an instruction header, the instruction header identifying the on-path telemetry data to be collected at the node and instructing the node to transmit a postcard containing the on-path telemetry data and a branch identifier to a collector, the branch identifier comprising a node identifier (ID) and a branch index. The node also includes a transmitter coupled to the processor. The transmitter is configured to transmit the postcard to the collector in accordance with the instruction header; and transmit the instruction header to a downstream node.

The node provides techniques that support efficient multicast traffic on-path telemetry. In particular, the node provides a per-hop postcard technique to improve the PBT process. By utilizing the technique, suitable on-path telemetry may be obtained for multicast traffic. In addition, the techniques may be used to reconstruct and visualize a multicast tree, to conduct performance monitoring, and to perform trouble shooting.

In a first implementation form of the node according to the fourth aspect as such, the branch index identifies a branch from which the instruction header was received.

In a second implementation form of the node according to the fourth aspect as such or any preceding implementation form of the fourth aspect, the branch index is an arbitrary number when the node is a root node.

In a third implementation form of the node according to the fourth aspect as such or any preceding implementation form of the fourth aspect, the instruction header is appended to a multicast packet in accordance with an instruction received from a controller.

In a fourth implementation form of the node according to the fourth aspect as such or any preceding implementation form of the fourth aspect, the instruction header is appended to a multicast packet when received.

In a fifth implementation form of the node according to the fourth aspect as such or any preceding implementation form of the fourth aspect, the instruction header is appended to a multicast packet when transmitted.

In a sixth implementation form of the node according to the fourth aspect as such or any preceding implementation form of the fourth aspect, the instruction header is received from an upstream node.

In a seventh implementation form of the node according to the fourth aspect as such or any preceding implementation form of the fourth aspect, the node ID identifies the node when the node is a root node.

In an eighth implementation form of the node according to the fourth aspect as such or any preceding implementation form of the fourth aspect, the node ID identifies an upstream node from which the instruction header was received when the node is a branch node or a leaf node.

In a ninth implementation form of the node according to the fourth aspect as such or any preceding implementation form of the fourth aspect, the branch identifier is represented by a tuple with the format [node ID, index].

In a tenth implementation form of the node according to the fourth aspect as such or any preceding implementation form of the fourth aspect, the branch index is utilized to construct a network topology.

In an eleventh implementation form of the node according to the fourth aspect as such or any preceding implementation form of the fourth aspect, the node comprises a receiver coupled to the processor, the receiver configured to receive an instruction from a controller, the instruction instructing the node to append the instruction header to a multicast packet.

A fifth aspect relates to a means for means for collecting on-path telemetry data in a multicast network. The means includes processing means configured to collect the on-path telemetry data in accordance with an instruction header, the instruction header identifying the on-path telemetry data to be collected at the node and instructing the node to transmit a postcard containing the on-path telemetry data collected at all nodes in a section to a collector when the node comprises an end node of the section; and determine whether the node is the end node of the section. The means for collecting also includes transmitting means coupled to the processing means. The transmitting means configured to: transmit the instruction header and the on-path telemetry data that was collected by the node to a downstream node when the node is not the end node of the section; and transmit the postcard to the collector when the node is the end node of the section, the postcard containing the on-path telemetry collected at all of the nodes in the section.

The means for collecting provides techniques that support efficient multicast traffic on-path telemetry. In particular, the means for collecting provides a per-section postcard technique to improve the IOAM process. By utilizing the technique, suitable on-path telemetry may be obtained for multicast traffic. In addition, the techniques may be used to reconstruct and visualize a multicast tree, to conduct performance monitoring, and to perform trouble shooting.

In a first implementation form of the means for collecting according to the fifth aspect as such, the means for collecting further includes means for receiving configured to receive an instruction from a controller, the instruction instructing the means for collecting to append the instruction header to a multicast packet.

A sixth aspect relates to a means for means for collecting on-path telemetry data in a multicast network. The means for collecting includes processing means configured to collect the on-path telemetry data in accordance with an instruction header, the instruction header identifying the on-path telemetry data to be collected at the node and instructing the node to transmit a postcard containing the on-path telemetry data and a branch identifier to a collector, the branch identifier comprising a node identifier (ID) and a branch index. The means for collecting also includes transmitting means coupled to the processing means. The transmitting means configured to transmit the postcard to the collector in accordance with the instruction header; and transmit the instruction header to a downstream node.

The means for collecting provides techniques that support efficient multicast traffic on-path telemetry. In particular, the means for collecting provides a per-hop postcard technique to improve the PBT process. By utilizing the technique, suitable on-path telemetry may be obtained for multicast traffic. In addition, the techniques may be used to reconstruct and visualize a multicast tree, to conduct performance monitoring, and to perform trouble shooting.

In a first implementation form of the means for collecting according to the sixth aspect as such, the means for collecting further includes means for receiving configured to receive an instruction from a controller, the instruction instructing the node to append the instruction header to a multicast packet.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Operations, administration, and management or operations, administration and maintenance (OAM) are the processes, activities, tools, and standards involved with operating, administering, managing, and maintaining any system. This commonly applies to telecommunication, computer networks, and computer hardware.

Unlike unicast traffic, existing techniques for multicast traffic are unable to obtain direct and accurate information. More specifically, new on-path telemetry techniques such as In-situ OAM (IOAM), as described in Internet Engineering Task Force (IETF) document draft-brockners-inband-oam-data-07 entitled "Data Fields for In-situ OAM," dated Jul. 2, 2017, and Postcard-based Telemetry (PBT), as described in IETF document draft-song-ippm-postcard-based-telemetry-03 entitled "Postcard-based On-Path Flow Data Telemetry," dated Jun. 12, 2019, fail to provide support for multicast traffic. This is due at least in part to the unique characteristics of multicast traffic. Indeed, multicast packets are replicated at each branch node in the corresponding multicast tree. Therefore, there are multiple copies of packets in the network.

When IOAM is used for on-path data collection, partial trace data (i.e., the data from each node, a.k.a., hop) will also be replicated into multiple copies. The end result is that each copy of the multicast packet has a complete trace (which represents the entire path). Most of the data is redundant. Data redundancy introduces unnecessary header overhead, wastes network bandwidth, and complicates the data processing. When the multicast tree is large and the path is long, the problems and resource costs from redundancy become severe.

PBT can be used to eliminate such data redundancy because each node on the tree only sends a postcard covering local data. A postcard is described in the IETF document "Postcard-based On-Path Flow Data Telemetry" noted above. However, PBT cannot track the branches of the tree properly. As such, PBT is unable to provide suitable information about the multicast tree topology. The fundamental reason for this problem is that there is not an identifier, either implicit or explicit, to correlate the data on each branch.

Disclosed herein are traffic monitoring techniques that solve the above mentioned problems in order to support efficient multicast traffic on-path telemetry. As will be more fully explained below, two solutions are provided—a per-section postcard technique to improve the IOAM process and a per-hop postcard technique to improve the PBT process. By utilizing these techniques, suitable on-path telemetry may be obtained for multicast traffic. In addition, these techniques may be used to reconstruct and visualize a multicast tree, to conduct performance monitoring, and to perform trouble shooting.

Figure 1:
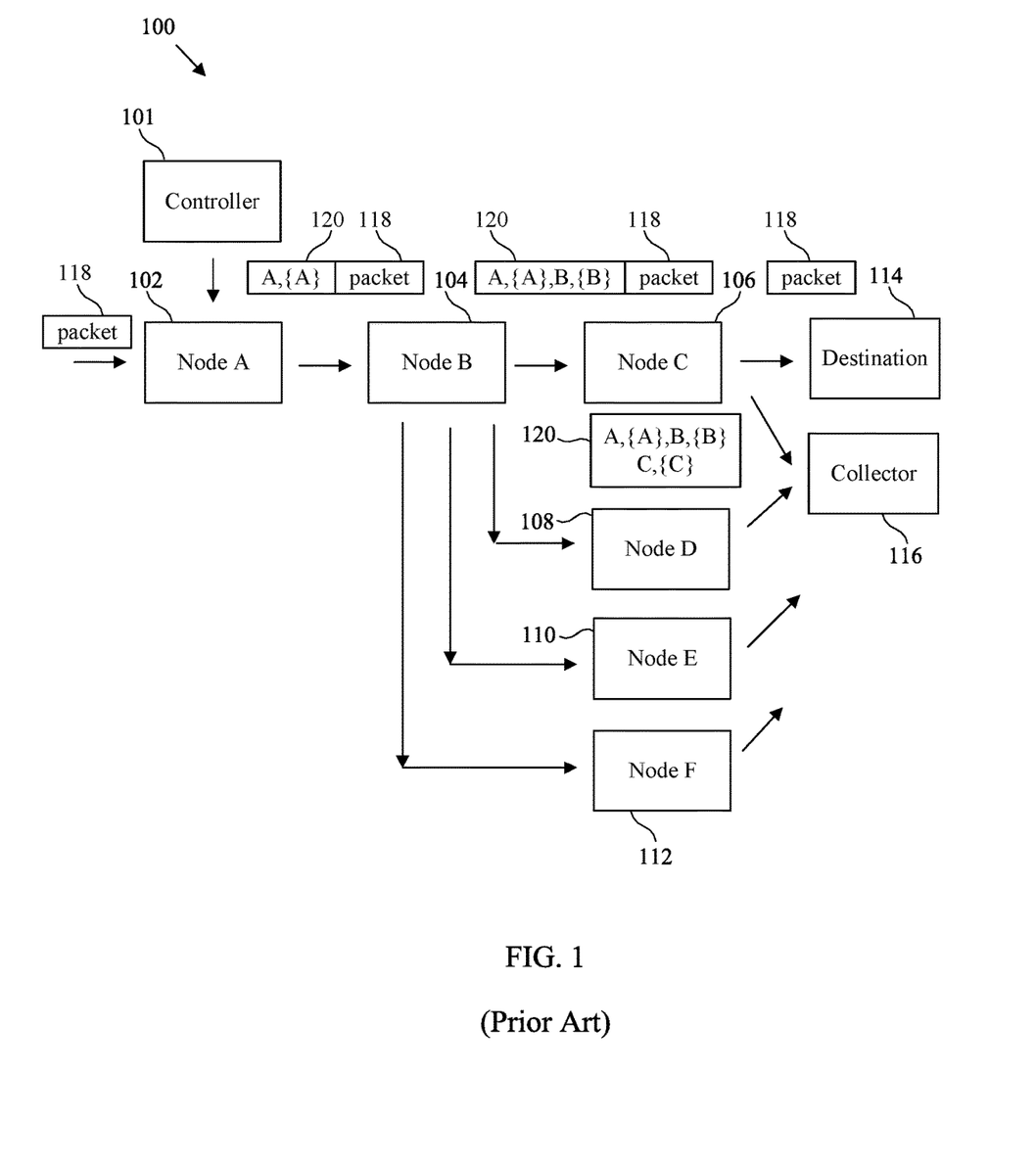
FIG. 1 is a diagram of an In-situ OAM (IOAM) process in a network.

FIG. 1 is a diagram of an IOAM process in a network 100. The network 100 of FIG. 1 includes a controller 101, a plurality of nodes 102, 104, 106, 108, 110, and 112, a destination 114, and a collector 116. The network 100 may also include other devices in practical applications. The controller 101 (a.k.a., network controller) is in communication with the nodes 102-112. The communication may be performed through wired links, wireless links, an interface, or some other type of connection or communication medium. As will be more fully explained below, the controller 101 may send various instructions to the nodes 102-112 to facilitate the IOAM process in the network 100.

Each of the nodes 102-112 may be a router, bridge, switch, or other network device configured to receive a multicast packet 118, replicate the multicast packet 118, append an instruction header 120 to the multicast packet 118, and transmit the multicast packet 118 with the instruction header 120 to another node on the path (represented by the arrows between nodes), and transmit the multicast packet 118 to the destination 114. For the purpose of discussion, the nodes 102-112 in FIG. 1 are labeled Node A, Node B, Node C, Node D, Node E, and Node F, respectively.

Due to the position of node 102 at the beginning of the path extending from node 102 to the destination 114, node 102 may be referred to as a root node. Likewise, due to the position of nodes 106-112 at the end of the path extending from node 102 to nodes 106-112, each of the nodes 106-112 may be referred to as an end node. As shown in FIG. 1, node 104 replicates the multicast packet 118 received from node 102 and transmits a copy of the multicast packet 118 to each of nodes 106-112. Therefore, node 104 may be referred to as a branch node. Nodes 106-112 may be referred to as leaf nodes. Any node that is either a root node or a node that replicates the multicast packet 118 may be referred to as a branch node. As shown in FIG. 1, node 102 is considered to be upstream of node 104 and nodes 106-112 are considered to be downstream of node 104.

The nodes 102-112 are configured to implement instructions received from the controller 101. Such instructions may include, for example, an instruction to append a header to the multicast packet 118, to collect on-path telemetry data at the node, and so on. The on-path telemetry data may include, but is not limited to, the detailed forwarding path, the timestamp/latency at each network node, the drop location and reason in case of packet drop, and so on.

The destination 114 is configured to receive the multicast packet 118 from, for example, the nodes 106-112 at the end of the path. The destination 114 may represent a user device such as a personal computer, laptop, mobile phone, tablet, smart watch, and so on. The collector 116 is configured to receive information such as the on-path telemetry data from the nodes 106-112 at the end of the path.

While the network 100 is well-suited for unicast traffic, the same is not true for multicast traffic. An example will be provided to illustrate the point. As shown in FIG. 1, the controller 101 transmits an instruction to node 102 (represented by the arrow from the controller to node 102). The instruction may, for example, instruct the node 102 to append the instruction header 120 to the multicast packet 118. The instruction header 120 may identify the on-path telemetry data to be collected at each node.

In accordance with the instruction header 120, the node 102 collects the on-path telemetry data corresponding to node 102. Thereafter, the node 102 inserts a node identifier (ID) and the on-path telemetry data that was collected into the instruction header 120. The node ID is represented by the letter A in the instruction header 120. The on-path telemetry data that was collected at node 102 is represented by the designation {A} in the instruction header 120. Thereafter, the multicast packet 118 and the instruction header 120, which includes the node ID A and the on-path telemetry data {A}, are transmitted to node 104.

In accordance with the instruction header 120, the node 104 collects the on-path telemetry data corresponding to node 104. Thereafter, the node 104 inserts a node ID and the on-path telemetry data that was collected into the instruction header 120. The node ID is represented by the letter B in the instruction header 120. The on-path telemetry data that was collected at node 104 is represented by the designation {B} in the instruction header 120.

Because node 104 is a branch node, the node 104 replicates the multicast packet 118. Thereafter, a copy of the multicast packet 118 and the instruction header 120, which now includes the node IDs A and B and on-path telemetry data {A} and {B}, are transmitted to node 106, node 108, node 110, and node 112. In accordance with the instruction header 120, node 106 collects the on-path telemetry data corresponding to node 106, node 108 collects the on-path telemetry data corresponding to node 108, node 110 collects the on-path telemetry data corresponding to node 110, and node 112 collects the on-path telemetry data corresponding to node 112.

As shown in FIG. 1, the instruction header 120 is removed from the multicast packet 118 by the nodes 106-112 and one or more of the nodes 106-112 transmit the multicast packet 118 to the destination 114 (or to a plurality of different destinations, to a downstream node, etc.). In addition, each of the nodes 106-112 adds their respective node ID and the on-path telemetry data that was collected at the node to the instruction header 120. For example, node 106 adds node ID C and telemetry data {C} to the instruction header 120. Thereafter, node 106 transmits the instruction header 120 containing node IDs A, B, and C and telemetry data {A}, {B}, and {C} to the collector 116 as shown in FIG. 1. Although not shown, node 108 transmits the instruction header 120 containing node IDs A, B, and D and telemetry data {A}, {B}, and {D} to the collector 116. Likewise, node 110 transmits the instruction header 120 containing node IDs A, B, and E and telemetry data {A}, {B}, and {E} to the collector 116 and node 112 transmits the instruction header 120 containing node IDs A, B, and F and telemetry data {A}, {B}, and {F} to the collector 116.

From the foregoing, it should be recognized that the collector 116 receives redundant data from nodes 106-112. Indeed, the collector 116 receives the same on-path telemetry data {A} and {B} from each of nodes 106-112. The more nodes there are in the network 100 sending information to the collector 116, the more severe the redundancy. Therefore, as mentioned above, the network 100 is not particularly suited to multicast traffic.

Figure 2:
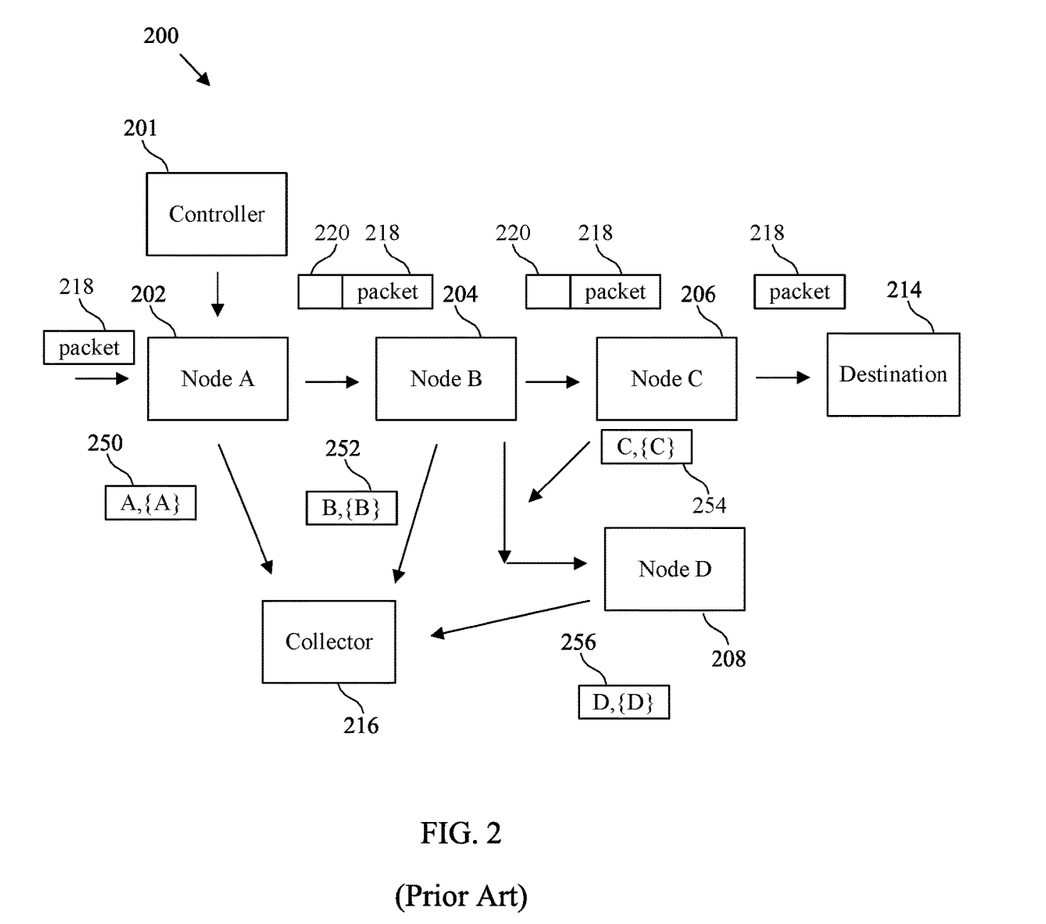
FIG. 2 is a diagram of a Postcard-based Telemetry (PBT) process in a network.

FIG. 2 is a diagram of a PBT process in a network 200. The network 200 of FIG. 2 includes a controller 201, a plurality of nodes 202, 204, 206, and 208, a destination 214, and a collector 216. The network 200 may also include other devices in practical applications. The controller 201 is in communication with the nodes 202-208. The communication may be performed through wired links, wireless links, an interface, or some other type of connection or communication medium. As will be more fully explained below, the controller 201 may send various instructions to the nodes 202-206 to facilitate the PBT process in the network 200.

Each of the nodes 202-208 may be a router, bridge, switch, or other network device configured to receive a packet 218 (a.k.a., a multicast packet), replicate the packet 218, append an instruction header 220 to the packet 218, transmit the packet 218 with the instruction header 220 to another node on the path, transmit the packet 218 to the destination 214, and generate and transmit a postcard 250-256 to the collector 216. For the purpose of discussion, the nodes 202-208 in FIG. 2 are labeled Node A, Node B, Node C, and Node D, respectively.

Due to the position of node 202 at the beginning of the path extending from node 202 to the destination 214, node 202 may be referred to as a root node. Likewise, due to the position of nodes 206-208 at the end of the path extending from node 202 to the destination 214, each of the nodes 206-208 may be referred to as an end node. As shown in FIG. 2, node 204 replicates the packet 218 received from node 202 and transmits a copy of the packet 218 to each of nodes 206-208. Therefore, node 204 may be referred to as a branch node. Nodes 206-208 may be referred to as leaf nodes. Any node that is either a root node or a node that replicates the packet 218 may be referred to as a branch node. As shown in FIG. 2, node 202 is considered to be upstream of node 204 and nodes 206-208 are considered to be downstream of node 204.

The nodes 202-208 are configured to implement instructions received from the controller 201. Such instructions may include, for example, an instruction to append a header to the packet 218, to collect on-path telemetry data at the node, and so on. The on-path telemetry data may include, but is not limited to, the detailed forwarding path, the timestamp/latency at each network node, the drop location and reason in case of packet drop, and so on.

The destination 214 is configured to receive the packet 218 from, for example, the nodes 206-208 at the end of the path. The destination 214 may represent a user device such as a personal computer, laptop, mobile phone, tablet, smart watch, and so on. The collector 216 is configured to receive information such as the on-path telemetry data from each of the nodes 202-208 along the path.

While the network 200 is well-suited for unicast traffic, the same is not true for multicast traffic. An example will be provided to illustrate the point. As shown in FIG. 2, the controller 201 transmits an instruction to node 202 (represented by the arrow from the controller to node 202). The instruction may, for example, instruct the node 202 to append the instruction header 220 to the packet 218. The instruction header 220 may identify the on-path telemetry data to be collected at each node.

In accordance with the instruction header 220, the node 202 collects the on-path telemetry data corresponding to node 202. Thereafter, the node 202 inserts a node ID and the on-path telemetry data that was collected into the postcard 250. The node ID is represented by the letter A in the postcard 250. The on-path telemetry data that was collected at node 202 is represented by the designation {A} in the postcard 250. The postcard 250 is transmitted to the collector 216. The packet 218 and the instruction header 220 are transmitted to node 204.

In accordance with the instruction header 220, the node 204 collects the on-path telemetry data corresponding to node 204. Thereafter, the node 204 inserts a node ID and the on-path telemetry data that was collected into the postcard 252. The node ID is represented by the letter B in the postcard 252. The on-path telemetry data that was collected at node 204 is represented by the designation {B} in the postcard 252. The postcard 252 is transmitted to the collector 216.

Because node 204 is a branch node, the node 204 replicates the packet 218. Thereafter, a copy of the packet 218 and the instruction header 220 are transmitted to node 206 and to node 208. In accordance with the instruction header 220, node 206 collects the on-path telemetry data corresponding to node 206 and node 208 collects the on-path telemetry data corresponding to node 208.

As shown in FIG. 2, the instruction header 220 is removed from the packet 218 by nodes 206-208 and one or more of the nodes 206-208 transmit the packet 218 to the destination 214 (or to a plurality of different destinations, to a downstream node, etc.). Thereafter, the node 206 inserts a node ID and the on-path telemetry data that was collected into the postcard 254. The node ID is represented by the letter C in the postcard 254. The on-path telemetry data that was collected at node 206 is represented by the designation {C} in the postcard 254. The postcard 254 is transmitted to the collector 216.

Likewise, the node 208 inserts a node ID and the on-path telemetry data that was collected into the postcard 256. The node ID is represented by the letter D in the postcard 256. The on-path telemetry data that was collected at node 208 is represented by the designation {D} in the postcard 256. The postcard 256 is transmitted to the collector 216.

From the foregoing, it should be recognized that the collector 216 receives a postcard 250-256 containing on-path telemetry data from each of the nodes 202-208. However, the postcards 250-256 do not contain any branch identifier. As such, the collector 216 is unable to correlate the postcards 250-256. Therefore, as mentioned above, the network 200 is not particularly suited to multicast traffic.

Figure 3:
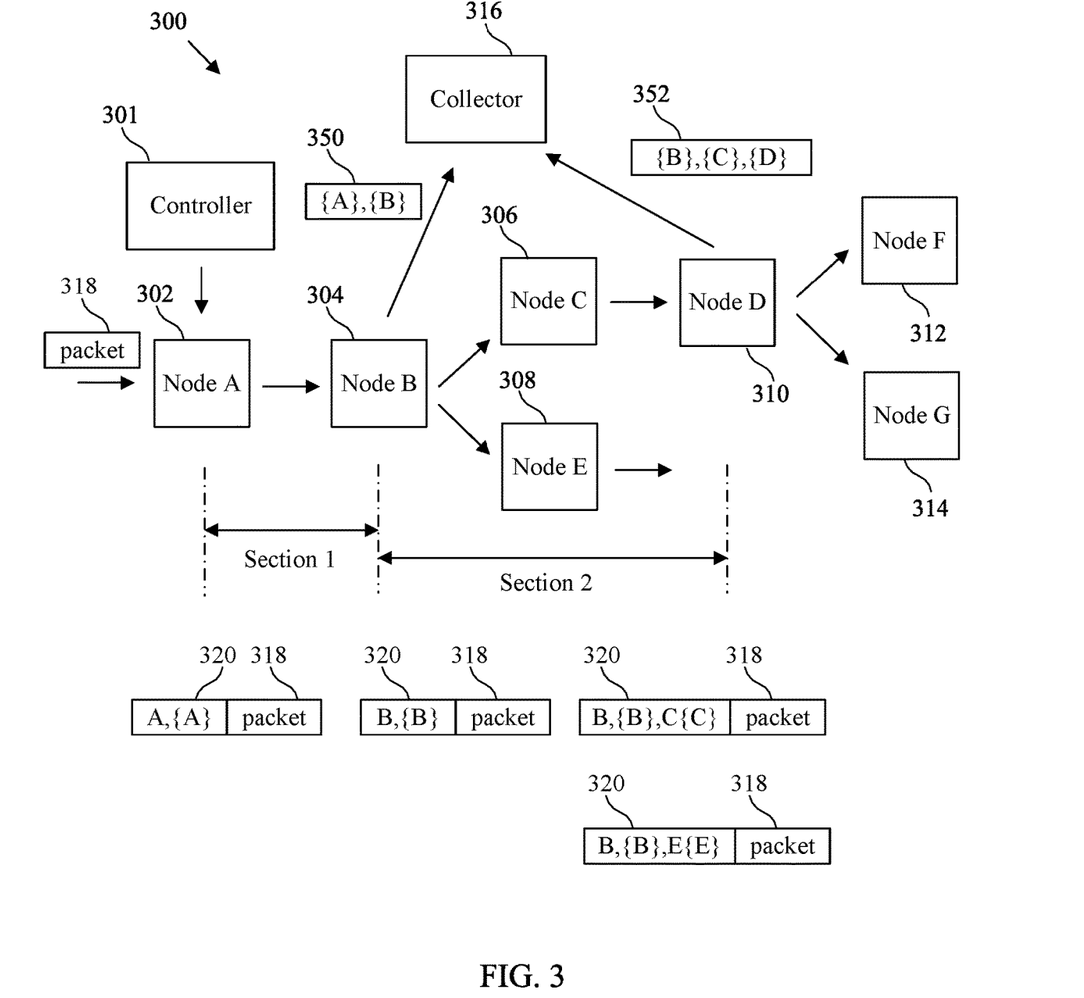
FIG. 3 is a diagram of a modified IOAM process in a network according to an embodiment of the disclosure.

FIG. 3 is a diagram of a modified IOAM process in a network 300 in accordance with an embodiment of the disclosure. The network 300 of FIG. 3 includes a controller 301, a plurality of nodes 302, 304, 306, 308, 310, 312, and 314, and a collector 316. While the network 300 may include a destination similar to destinations 114, 214, such a destination has been omitted for brevity and simplicity. The network 300 may also include other devices in practical applications. The controller 301 is in communication with the nodes 302-314. The communication may be performed through wired links, wireless links, an interface, or some other type of connection or communication medium. As will be more fully explained below, the controller 301 may send various instructions to the nodes 302-314 to facilitate a modified IOAM process known as "per-section postcard" in the network 300.

Each of the nodes 302-314 may be a router, bridge, switch, or other network device configured to receive a packet 318 (a.k.a., a multicast packet), replicate the packet 318, append an instruction header 320 to the packet 318, transmit the packet 318 with the instruction header 120 to another node on the path, transmit the packet 318 to a destination (not shown), and generate and transmit a postcard 350-352 to the collector 316. For the purpose of discussion, the nodes 302-314 in FIG. 3 are labeled Node A, Node B, Node C, Node D, Node E, Node F, and Node G, respectively.

As shown in FIG. 3, node 302 is at the beginning of the path extending from node 302 to nodes 312 and 314. Therefore, node 302 may be referred to as a root node. Node 304 and node 310 each replicate the packet 318. Therefore, nodes 304 and 310 may be referred to as branch nodes. As used herein, a section is defined as a path between a root node and an adjacent branch node (e.g., between node 302 and node 304) or a path between adjacent branch nodes (e.g., between node 304 and node 310). In that regard, network 300 includes Section 1 extending between node 302 and node 304. Notably, node 304 is at the end of Section 1, and node 310 is at the end of Section 2. Therefore, node 304 may be referred to as the end node of Section 1, and node 310 may be referred to as the end node of Section 2. Nodes 306-308 and 312-314 may be referred to as leaf nodes. As shown in FIG. 3, node 302 is considered to be upstream of node 304 and nodes 306-308 are considered to be downstream of node 304.

The nodes 302-314 are configured to implement instructions received from the controller 301. Such instructions may include, for example, an instruction to append a header to the packet 318, to collect on-path telemetry data at the node, and so on. The on-path telemetry data may include, but is not limited to, the detailed forwarding path, the timestamp/latency at each network node, the drop location and reason in case of packet drop, and so on.

A destination (not shown) is configured to receive the packet 318 from, for example, the nodes 308, 312, and 314 at the end of the path. The destination may represent a user device such as a personal computer, laptop, mobile phone, tablet, smart watch, and so on. The collector 316 is configured to receive information such as the on-path telemetry data from the nodes 304 and 310 at the end of Section 1 or Section 2, respectively.

Unlike network 100, network 300 is well-suited for multicast traffic. An example will be provided to illustrate the point. As shown in FIG. 3, the controller 301 transmits an instruction to node 302 (represented by the arrow from the controller 301 to node 302). The instruction may, for example, instruct the node 302 to append the instruction header 320 to the packet 318. The instruction header 320 may identify the on-path telemetry data to be collected at the node and instruct the node to transmit a postcard containing the on-path telemetry data collected at all nodes in a section to a collector when the node comprises an end node of the section.

In accordance with the instruction header 320, the node 302 collects the on-path telemetry data corresponding to node 302. Thereafter, the node 302 determines whether the node 302 is the end node of the section. As shown in FIG. 3, node 302 is not the end node of Section 1. Thus, the node 302 inserts a node ID and the on-path telemetry data that was collected into the instruction header 320. The node ID is represented by the letter A in the instruction header 320. The on-path telemetry data that was collected at node 302 is represented by the designation {A} in the instruction header 320. Thereafter, the packet 318 and the instruction header 320, which includes the node ID A and the on-path telemetry data {A}, are transmitted to node 304.

In accordance with the instruction header 320, the node 304 collects the on-path telemetry data corresponding to node 304. Thereafter, the node 304 determines whether the node 304 is the end node of the section. As shown in FIG. 3, node 304 is the end node of Section 1. Thus, the node 304 transmits the postcard 350 to the collector 316. The postcard 350 contains the telemetry data {A} and {B} corresponding to nodes 302 and 304, respectively.

As shown, node 304 inserts a node ID and the on-path telemetry data that was collected into the instruction header 320. The node ID is represented by the letter B in the instruction header 320. The on-path telemetry data that was collected at node 304 is represented by the designation {B} in the instruction header 320. Notably, the node ID A and the on-path telemetry data {A} corresponding to node 302 are not included in the instruction header 320 transmitted from node 304 to nodes 306 and 308.

In accordance with the instruction header 320, node 306 collects the on-path telemetry data corresponding to node 306. Thereafter, the node 306 inserts node ID C and the on-path telemetry data {C} into the instruction header 320. Then, the packet 318 and the instruction header containing the node IDs B and C and the on-path telemetry data {B} and {C} are transmitted from node 306 to node 310. Because node 306 is not an end node of a section (e.g., Section 2), node 306 does not transmit any postcard to the collector 316.

Node 308 acts similar to node 306. For example, node 308 collects the on-path telemetry data corresponding to node 308. Thereafter, the node 308 inserts node ID E and the on-path telemetry data {E} into the instruction header 320. Then, the packet 318 and the instruction header containing the node IDs B and E and the on-path telemetry data {B} and {E} are transmitted from node 308 to, for example, a downstream node or a destination. Because node 308 is not an end node of a section (e.g., Section 2), node 308 does not transmit any postcard to the collector 316.

In accordance with the instruction header 320, the node 310 collects the on-path telemetry data corresponding to node 310. Thereafter, the node 310 determines whether the node 310 is the end node of the section. As shown in FIG. 3, node 310 is the end node of Section 2. Thus, the node 304 transmits the postcard 352 to the collector 316. The postcard 352 contains the telemetry data {B}, {C}, and {D} corresponding to nodes 304, 306, and 310, respectively.

Assuming that nodes 312 and 314 are not nodes at the end of a section, nodes 312 and 314 would act similarly to nodes 306 and 308. If, however, node 312 or node 314 is at the end of a section, then node 312 or node 314 would act similarly to node 304 and node 310.

From the foregoing, it should be recognized that the collector 316 receives postcard 350 and postcard 352, each of which contains a full data trace, e.g., the full on-path telemetry information, for their corresponding section. The postcards 350 and 352 can be stitched together to provide full trace data for the entire path. Moreover, the amount of redundant data transmitted to the collector 316 and carried in the instruction headers 320 is reduced relative to the amount of similar information carried in network 100. Therefore, the network 300 is better suited to efficiently accommodate multicast traffic.

Figure 4:
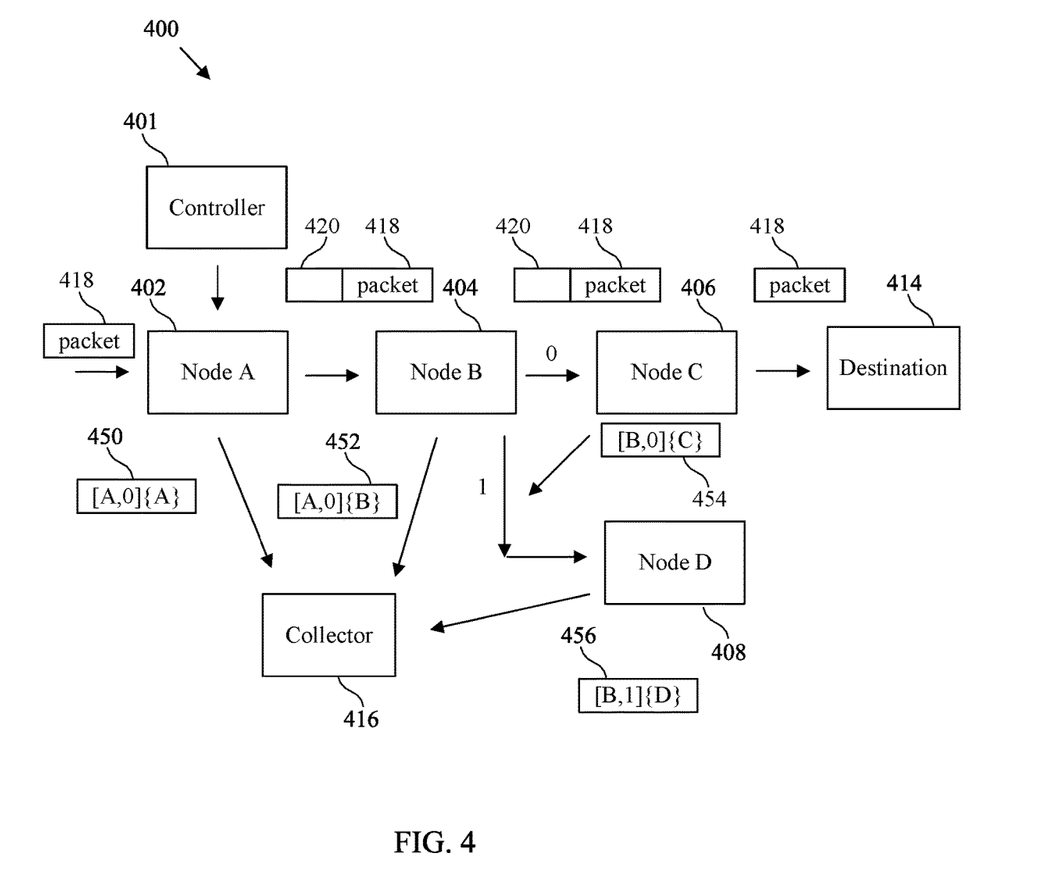
FIG. 4 is a diagram of a modified PBT process in a network according to an embodiment of the disclosure.

FIG. 4 is a diagram of a modified PBT process in a network 400 in accordance with an embodiment of the disclosure. The network 400 of FIG. 4 includes a controller 401, a plurality of nodes 402, 404, 406, and 408, a collector 416, and a destination 414. The network 400 may also include other devices in practical applications. The controller 401 is in communication with the nodes 402-408. The communication may be performed through wired links, wireless links, an interface, or some other type of connection or communication medium. As will be more fully explained below, the controller 401 may send various instructions to the nodes 402-408 to facilitate a PBT IOAM process known as "per-hop postcard" in the network 400.

Each of the nodes 402-408 may be a router, bridge, switch, or other network device configured to receive a packet 418 (a.k.a., a multicast packet), replicate the packet 418, append an instruction header 420 to the packet 418, transmit the packet 418 with the instruction header 420 to another node on the path, transmit the packet 418 to the destination 414, and generate and transmit a postcard 450, 452, 454, 456 to the collector 416. For the purpose of discussion, the nodes 402-408 in FIG. 4 are labeled Node A, Node B, Node C, and Node D, respectively.

As shown in FIG. 4, node 402 is at the beginning of the path extending from node 402 to nodes 406 and 408. Therefore, node 402 may be referred to as a root node. Node 404 replicates the packet 418. Therefore, node 404 may be referred to as a branch node. Nodes 406-408 may be referred to as leaf nodes. As shown in FIG. 4, node 402 is considered to be upstream of node 404 and nodes 406-408 are considered to be downstream of node 404.

The nodes 402-408 are configured to implement instructions received from the controller 401. Such instructions may include, for example, an instruction to append a header to the packet 418, to collect on-path telemetry data at the node, and so on. The on-path telemetry data may include, but is not limited to, the detailed forwarding path, the timestamp/latency at each network node, the drop location and reason in case of packet drop, and so on.

The destination 414 is configured to receive the packet 418 from, for example, the nodes 406-408 at the end of the path. The destination 414 may represent a user device such as a personal computer, laptop, mobile phone, tablet, smart watch, and so on. The collector 416 is configured to receive information such as the on-path telemetry data from the nodes 402-408 along the path.

Unlike network 200, network 400 is well-suited for multicast traffic. An example will be provided to illustrate the point. As shown in FIG. 4, the controller 401 transmits an instruction to node 402 (represented by the arrow from the controller 401 to node 402). The instruction may, for example, instruct the node 402 to append the instruction header 420 to the packet 418. The instruction header 420 may identify the on-path telemetry data to be collected at the node and instruct the node to transmit a postcard containing the on-path telemetry data and a branch identifier to a collector. In an embodiment, the branch identifier comprises a node ID and a branch index.

In an embodiment, the branch identifier is represented by a tuple containing the node ID and the branch index, e.g., [A,0]. In an embodiment, the branch index (e.g., 0, 1, 2, etc.) identifies a branch from which the instruction header 420 was received. In an embodiment, the branch index is an arbitrary number when the node transmitting the instruction header 420 is a root node. While the branch index is described herein as one of several consecutive number, the branch index can be another value or designation in other embodiments (e.g., a, b, c, etc., 10, 20, 30, etc., i, ii, iii, etc.).

In accordance with the instruction header 420, the node 402 collects the on-path telemetry data corresponding to node 402. Thereafter, the node 402 inserts the branch identifier and the on-path telemetry data that was collected into the postcard 450. The branch identifier is represented by the designation [A,0] in the postcard 450 that is produced to collector 416. The on-path telemetry data that was collected at node 402 is represented by the designation {A} in the postcard 450. Thereafter, the postcard 450 is transmitted to the collector 416 and the packet 418 and the instruction header 420 are transmitted to node 404.

In accordance with the instruction header 420, the node 404 collects the on-path telemetry data corresponding to node 404. Thereafter, the node 404 inserts the branch identifier and the on-path telemetry data that was collected into the postcard 452 that is produced to collector 416. In an embodiment, the node ID in the branch identifier identifies an upstream node from which the instruction header was received when the node is a branch node or a leaf node. As such, the branch identifier in the postcard 452 does not include the node ID B. Rather, the branch identifier in the postcard 452 contains the node ID A to identify the upstream node from which the instruction header 420 was received. Indeed, as shown in FIG. 4, the branch identifier is represented by the designation [A,0] in the postcard 452. The on-path telemetry data that was collected at node 404 is represented by the designation {B} in the postcard 452 and is transmitted to the collector 416 as previously mentioned. Because node 404 is a branch node, the packet 418 is replicated and the packet 418 and the instruction header 420 are transmitted to nodes 406 and 408.

In accordance with the instruction header 420, the node 406 collects the on-path telemetry data corresponding to node 406. Thereafter, the node 406 inserts the branch identifier and the on-path telemetry data that was collected into the postcard 454. As shown in FIG. 4, the branch identifier is represented by the designation [B, 0] in the postcard 454. Notably, the branch index of 0 is used to represent the branch from which the instruction header 420 was received. The on-path telemetry data that was collected at node 406 is represented by the designation {C} in the postcard 454. Thereafter, the postcard 454 is transmitted to the collector 416. Because node 406 is an end node, the instruction header 420 is removed and the packet 418 is transmitted to the destination.

In accordance with the instruction header 420, the node 408 collects the on-path telemetry data corresponding to node 408. Thereafter, the node 408 inserts the branch identifier and the on-path telemetry data that was collected into the postcard 456. As shown in FIG. 4, the branch identifier is represented by the designation [B,1] in the postcard 456. Notably, the branch index of 1 is used to represent the branch from which the instruction header 420 was received. The on-path telemetry data that was collected at node 408 is represented by the designation {D} in the postcard 456. Thereafter, the postcard 456 is transmitted to the collector 416. If node 408 is an end node, the instruction header 420 is removed and the packet 418 is transmitted to the destination. If node 408 is not an end node, the packet 418 and the instruction header 420 are transmitted to a downstream node.

From the foregoing, it should be recognized that the collector 416 receives postcards 450, 452, 454, and 456, each of which carries the branch identifier containing the node ID and the branch index. Using the node ID and the branch index, the postcards 450, 452, 454, and 456 can be correlated such that a full data trace for the entire path may be determined. Therefore, the network 400 is better suited to efficiently accommodate multicast traffic.

Figure 5:
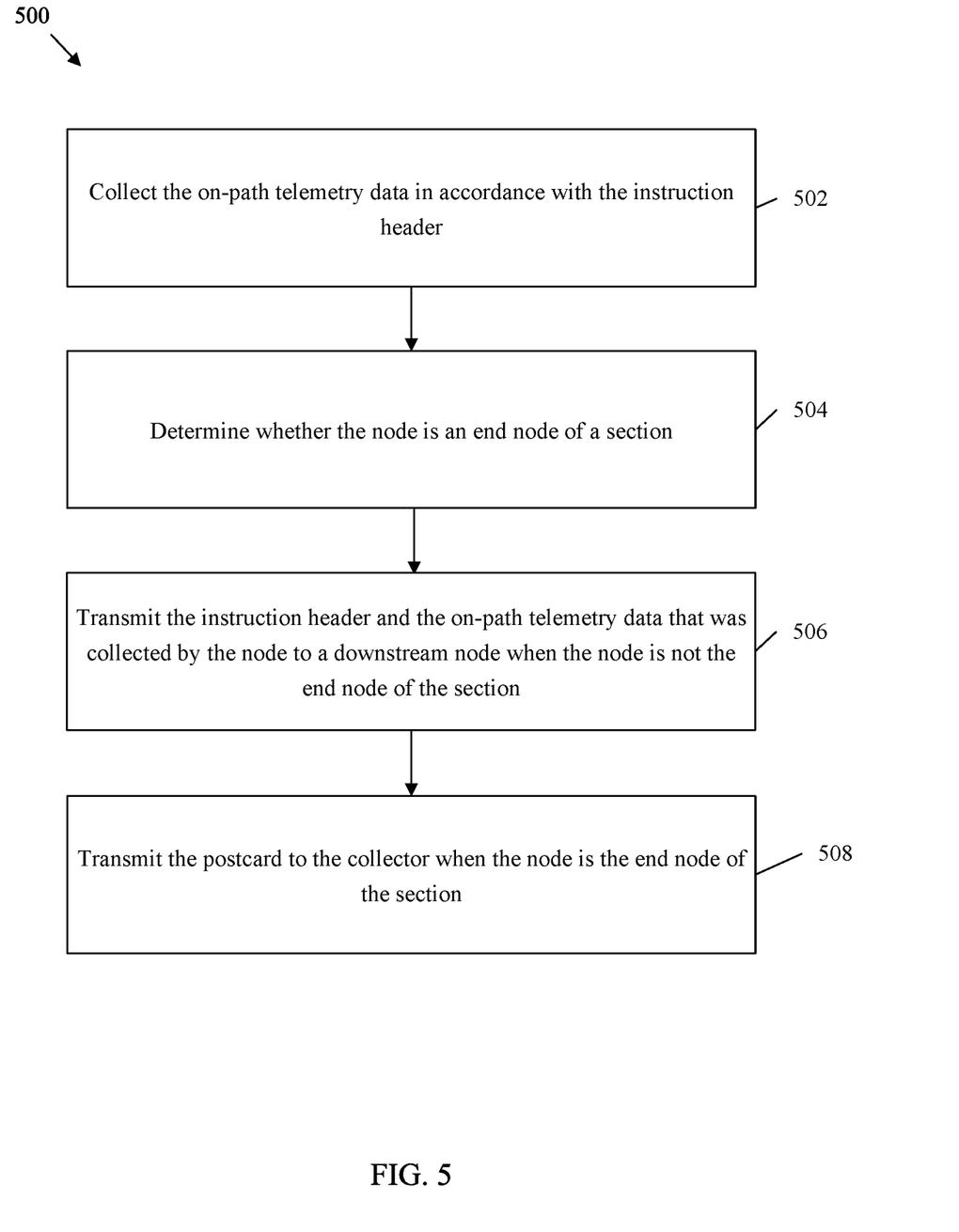
FIG. 5 is a method of collecting on-path telemetry data by a node according to an embodiment of the disclosure.

FIG. 5 is a method 500 of collecting on-path telemetry data by a node (e.g., node 303) in a multicast network (e.g., network 300). The method 500 may be performed to improve the IOAM process. The method 500 may be known as known as a "per-section postcard" method.

In block 502, the on-path telemetry data is collected in accordance with an instruction header. In an embodiment, the instruction header identifies the on-path telemetry data to be collected at the node and instructs the node to transmit a postcard (e.g., postcard 350) containing the on-path telemetry data collected at all nodes (e.g., nodes 302 and 304) in a section (e.g., Section 1 in FIG. 3) to a collector (e.g., collector 316) when the node comprises an end node of the section. In an embodiment, the section extends between a root node and the end node. In an embodiment, the section extends between a branch node and the end node.

In an embodiment, the instruction header is appended to a multicast packet in accordance with an instruction received from a controller. In an embodiment, the instruction header is appended to a multicast packet when received. In an embodiment, the instruction header is appended to a multicast packet when transmitted. In an embodiment, the instruction header is received from an upstream node.

In block 504, a determination of whether the node is the end node of the section is made. In block 506, the instruction header and the on-path telemetry data collected by the node are transmitted to a downstream node when the node is not the end node of the section. In block 508, the postcard is transmitted to the collector when the node is the end node of the section.

Figure 6:
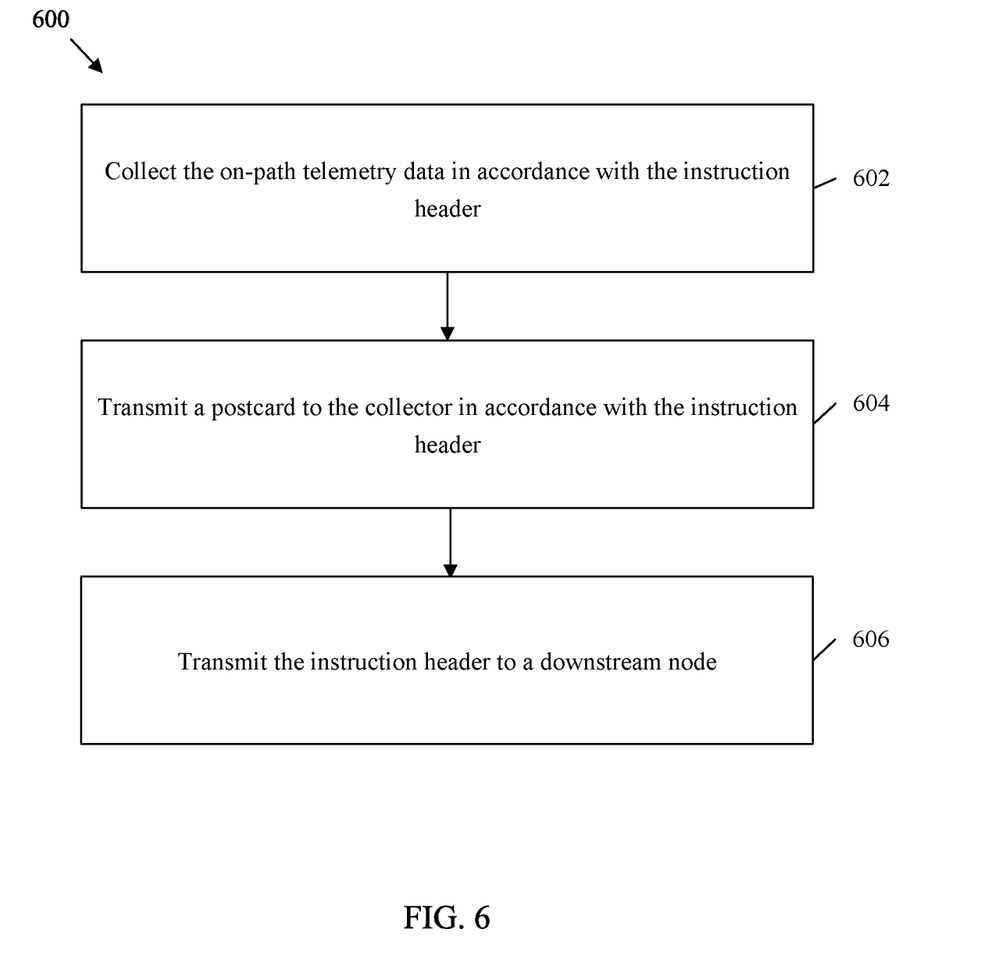
FIG. 6 is a method of collecting on-path telemetry data by a node according to an embodiment of the disclosure.

FIG. 6 is a method 600 of collecting on-path telemetry data by a node (e.g., node 402) in a multicast network (e.g., network 400). The method 600 may be performed to improve the PBT process. The method 600 may be known as known as a "per-hop postcard" method.

In block 602, the on-path telemetry data is collected in accordance with an instruction header (e.g., instruction header 420). In an embodiment, the instruction header identifies the on-path telemetry data to be collected at the node and instructs the node to transmit a postcard (e.g., postcard 450) containing the on-path telemetry data and a branch identifier to a collector. In an embodiment, the branch identifier comprises a node ID and a branch index.

In an embodiment, the branch index identifies a branch from which the instruction header was received. In an embodiment, the branch index is an arbitrary number when the node is a root node. In an embodiment, the instruction header is appended to a multicast packet in accordance with an instruction received from a controller (e.g., controller 401).

In an embodiment, the instruction header is appended to a multicast packet when received. In an embodiment, the instruction header is appended to a multicast packet when transmitted. In an embodiment, the instruction header is received from an upstream node.

In block 604, the postcard is transmitted to the collector in accordance with the instruction header. In block 606, the instruction header is transmitted to a downstream node.

Figure 7:
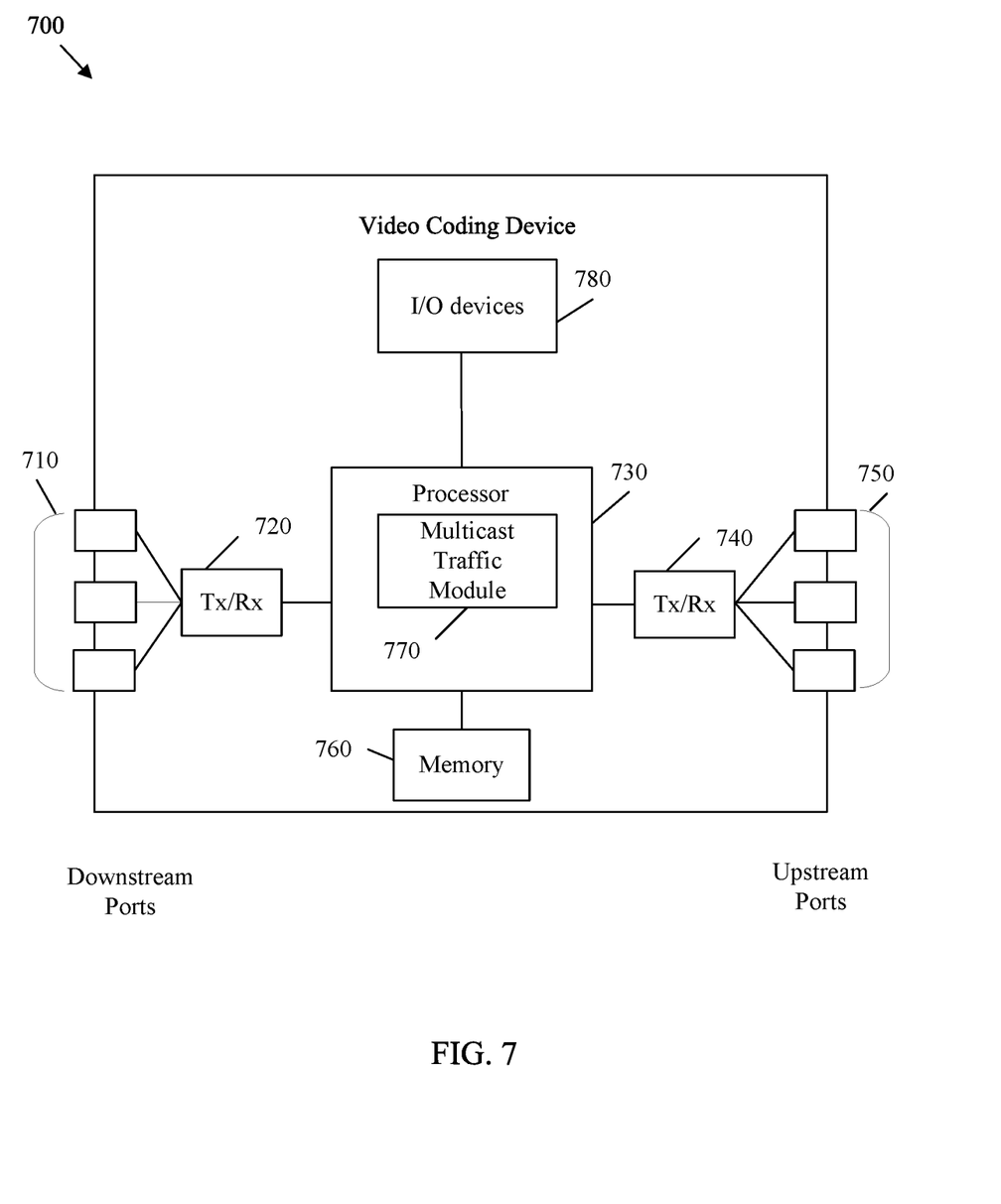
FIG. 7 is a schematic diagram of a network device according to an embodiment of the disclosure.

FIG. 7 is a schematic diagram of a network device 700 (e.g., node 304, node 402, a controller 301, 401, a collector 316, 416, etc.) according to an embodiment of the disclosure. The network device 700 is suitable for implementing the methods and processes disclosed herein. The network device 700 comprises ingress ports 710 and receiver units (Rx) 720 for receiving data; a processor, logic unit, or central processing unit (CPU) 730 to process the data; transmitter units (Tx) 740 and egress ports 750 for transmitting the data; and a memory 760 for storing the data. The network device 700 may also comprise optical-to-electrical (OE) components and electrical-to-optical (EO) components coupled to the ingress ports 710, the receiver units 720, the transmitter units 740, and the egress ports 750 for egress or ingress of optical or electrical signals.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the ingress ports 710, receiver units 720, transmitter units 740, egress ports 750, and memory 760. The processor 730 comprises a multicast traffic module 770. The multicast traffic module 770 implements the disclosed embodiments described above. The inclusion of the multicast traffic module 770 therefore provides a substantial improvement to the functionality of the network device 700 and effects a transformation of the network device 700 to a different state. Alternatively, the multicast traffic module 770 is implemented as instructions stored in the memory 760 and executed by the processor 730.

The network device 700 may also include input and/or output (I/O) devices 780 for communicating data to and from a user. The I/O devices 780 may include output devices such as a display for displaying video data, speakers for outputting audio data, etc. The I/O devices 780 may also include input devices, such as a keyboard, mouse, trackball, etc., and/or corresponding interfaces for interacting with such output devices.

The memory 760 comprises one or more disks, tape drives, and solid-state drives and may be used as an overflow data storage device, to store programs when such programs are selected for execution, and to store instructions and data that are read during program execution. The memory 760 may be volatile and non-volatile and may be read-only memory (ROM), random-access memory (RAM), ternary content-addressable memory (TCAM), and static random-access memory (SRAM).

Figure 8:
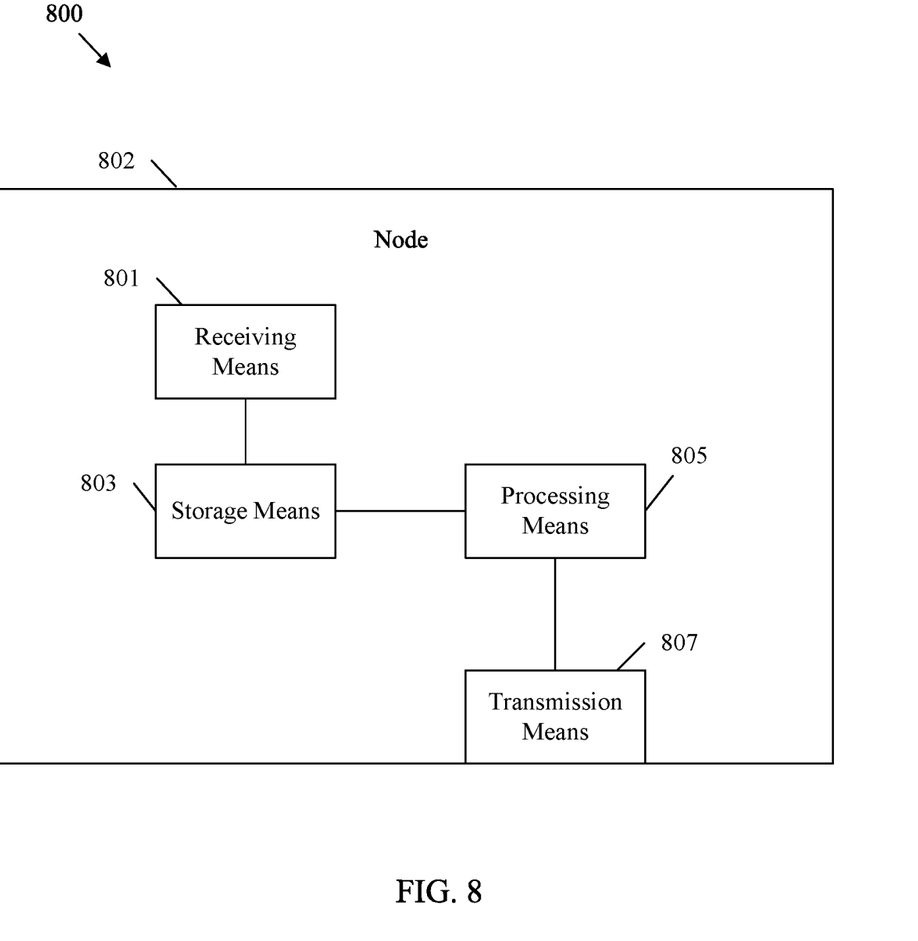
FIG. 8 is a schematic diagram of means for collecting on-path telemetry data in a multicast network according to an embodiment of the disclosure.

FIG. 8 is a schematic diagram of an embodiment of a means for collecting on-path telemetry data in a multicast network 800. In embodiment, the means for collecting on-path telemetry data in a multicast network 800 is implemented in a node 802 (e.g., node 304, 402, etc.). The node 802 includes receiving means 801. The receiving means 801 is configured to receive an instruction from a collector, receive a packet, receive an instruction header, and so on. The node 802 includes transmission means 807 coupled to the receiving means 801. The transmission means 807 is configured to transmit a postcard, a packet, an instruction header, and so on.

The node 802 includes a storage means 803. The storage means 803 is coupled to at least one of the receiving means 801 or the transmission means 807. The storage means 803 is configured to store instructions. The node 802 also includes processing means 805. The processing means 805 is coupled to the storage means 803. The processing means 805 is configured to execute the instructions stored in the storage means 803 to perform the methods disclosed herein.

The techniques noted above have been described in the context of an IOAM process and a PBT process. Even so, the techniques may also be applied to other multicast protocols such as Protocol-Independent Multicast (PIM), Point-to-multipoint (P2MP), Point-to-multipoint (P2MP), Multicast Label Distribution Protocol (MLDP), Resource Reservation Protocol (RSVP) for traffic engineering (RSVP-TE), and Bit Index Explicit Replication (BIER).

In addition, existing IOAM/PBT transport options may be utilized (e.g., Internet Protocol version 6 (IPv6) extension header, Virtual Extensible Local Area Network (VXLAN), Network Service Header (NSH), Multiprotocol Label Switching (MPLS), and Internet Protocol version 4 (IPv4), etc.).

Further, existing transport options for PIM may be utilized (e.g., IPv4/IPV6 User Datagram Protocol (UDP), etc.). Moreover, existing P2MP transport options may be utilized (e.g., MPLS, RSVP-TE, etc.). Finally, existing transport options for BIER may be utilized (e.g., the IPv6 extension header, Intermediate System to Intermediate System (ISIS), Open Shortest Path First version 2 (OSPFv2), MPLS, etc.)

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method of collecting on-path telemetry data by a node in a multicast network, the method comprising:
   receiving a multicast packet containing an instruction header;
   collecting on-path telemetry data at the node as instructed by the instruction header;
   determining whether the node is at an end of a section that extends between:
      a root node and an adjacent branch node, or
      adjacent branch nodes;
   transmitting a postcard containing the on-path telemetry data collected by all nodes in the section to a controller only after determining the node is at the end of the section and before the multicast packet is replicated for transmission to a plurality of downstream leaf nodes; and
   transmitting the instruction header and the on-path telemetry data collected by the node to a downstream node after determining the node is not at the end of the section.

2. The method of claim 1, wherein the instruction header is appended to a multicast packet in accordance with an instruction received from a controller.

3. The method of claim 1, wherein the instruction header is appended to a multicast packet when received.

4. The method of claim 1, wherein the instruction header is appended to a multicast packet when transmitted.

5. The method of claim 1, wherein the instruction header is received from an upstream node.

6. A method of collecting on-path telemetry data by a node in a multicast network, the method comprising:
   receiving a multicast packet containing an instruction header;
   collecting on-path telemetry data corresponding to the node as instructed by the instruction header;
   transmitting a postcard to a collector as instructed by the instruction header, the postcard containing a branch identifier and only the on-path telemetry data corresponding to the node, the node comprising a branch node or a leaf node, the branch identifier comprising a node identifier (ID) and a branch index, the node ID and the branch index configured to provide the collector with a full data trace for an entire path when correlated with node IDs and branch indexes of other postcards; and
   transmitting the instruction header to a downstream node.

7. The method of claim 6, wherein the branch index identifies a branch from which the instruction header was received.

8. The method of claim 6, wherein the branch index is an arbitrary number when the node is a root node.

9. The method of claim 6, wherein the instruction header is appended to a multicast packet in accordance with an instruction received from a controller.

10. The method of claim 6, wherein the instruction header is appended to a multicast packet when received.

11. The method of claim 6, wherein the instruction header is appended to a multicast packet when transmitted.

12. The method of claim 6, wherein the instruction header is received from an upstream node.

13. The method of claim 6, wherein the node ID identifies the node when the node is a root node.

14. The method of claim 6, wherein the node ID identifies an upstream node from which the instruction header was received when the node is a branch node or a leaf node.

15. The method of claim 6, wherein the branch identifier is represented by a tuple with the format [node ID, index].

16. The method of claim 6, wherein the branch index is utilized to construct a network topology.

17. A node configured to collect on-path telemetry data in a multicast network, the node comprising:
   a receiver configured to receive a multicast packet containing an instruction header;
   a processor coupled to the receiver, the processor executing instructions to cause the node to:
      collect the on-path telemetry data at the node as instructed by the instruction header; and
      determine whether the node is at an end of a section that extends between:
         a root node and an adjacent branch node, or
         adjacent branch nodes;
   a transmitter coupled to the processor, the processor executing instructions to cause the node to, via the transmitter:
      transmit a postcard to a collector only after determining the node is at the end of the section and before the multicast packet is replicated for transmission to a plurality of downstream leaf nodes; and
      transmit the instruction header and the on-path telemetry data collected by the node to a downstream node after determining the node is not at the end of the section.

18. The node of claim 17, wherein the instruction header is appended to a multicast packet in accordance with an instruction received from a controller.

19. The node of claim 17, wherein the instruction header is appended to a multicast packet when received.

20. The node of claim 17, wherein the instruction header is appended to a multicast packet when transmitted.

21. The node of claim 17, wherein the instruction header is received from an upstream node.

22. The node of claim 17, wherein the node comprises a receiver coupled to the processor, the receiver configured to receive an instruction from a controller, the instruction instructing the node to append the instruction header to a multicast packet.

* * * * *